United States Patent
Sarkar et al.

(10) Patent No.: US 10,241,867 B2
(45) Date of Patent: Mar. 26, 2019

(54) JOURNAL-LESS RECOVERY FOR NESTED CRASH-CONSISTENT STORAGE SYSTEMS

(71) Applicant: International Business Machines Corporation, Armonk, NY (US)

(72) Inventors: Prasenjit Sarkar, San Jose, CA (US); Mohit Saxena, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 14/533,034

(22) Filed: Nov. 4, 2014

(65) Prior Publication Data

US 2016/0124812 A1    May 5, 2016

(51) Int. Cl.
   *G06F 11/00*   (2006.01)
   *G06F 11/14*   (2006.01)
   *G06F 11/07*   (2006.01)

(52) U.S. Cl.
   CPC ...... *G06F 11/1435* (2013.01); *G06F 11/0751* (2013.01)

(58) Field of Classification Search
   None
   See application file for complete search history.

(56) References Cited

U.S. PATENT DOCUMENTS

| 6,185,552 | B1 * | 2/2001 | DeLong | ............ G06F 17/30324 |
| 6,697,846 | B1   | 2/2004 | Soltis  | |
| 2008/0256138 | A1 | 10/2008 | Sim-Tang | |
| 2012/0284317 | A1 * | 11/2012 | Dalton | ................. G06F 17/301 |
| | | | | 707/827 |
| 2013/0346557 | A1 | 12/2013 | Chang et al. | |

OTHER PUBLICATIONS

Weil, S.A., "Reliable, Scalable, and High-Performance Distributed Storage: Distributed Metadata Management", Feb. 19, 2014, IP.com, pp. 1-10, United States.
Anonymously, "Configurable Filesystem User Data Recovery from a System Dump", Oct. 14, 2011, IP.com, p. 1-6, United States.
Chidambaram, V. et al., "Optimistic Crash Consistency", Nov. 3-6, 2013, Proceedings of the Twenty-Fourth ACM Symposium on Operating Systems (SOSP' 13), pp. 228-243 ACM, New York, United States.

(Continued)

*Primary Examiner* — Matthew Bradley
*Assistant Examiner* — Craig S Goldschmidt
(74) *Attorney, Agent, or Firm* — Sherman IP LLP; Kenneth L. Sherman; Steven Laut

(57) ABSTRACT

A method for storing and recovering data for a file system includes a write process that performs a write instruction for data that includes atomically updating corresponding data blocks and metadata-links on a storage medium. The metadata-links contain links from data blocks to parent metadata blocks and links from metadata blocks to the parent metadata blocks. A journal-less recovery process that detects one or more inconsistencies for file system blocks comprising data blocks or metadata blocks upon a system failure based on one or more comparisons of information for the file system blocks.

20 Claims, 7 Drawing Sheets

(56) References Cited

OTHER PUBLICATIONS

Cao, M., et al., "Ext4: The Next Generation of Ext2/3 Filesystem", 2007, Linux Storage and Filesystem Workshop, downloaded from https://www.usenix.org/legacy/event/lsf07/tech/cao_m.pdf (Nov. 4, 2014), pp. 1-36, United States.

Best, S., "JFS Overview: How the Journaled File System cuts system restart times to the quick", Jan. 1, 2000, downloaded from http://web.archive.org/web/20080129101603/http://www-128.ibm.com/developerworks/library/l-jfs.html (Nov. 4, 2014), Wayback Machine, pp. 1-4, United States.

Best, S. et al., "JFS layout: How the Journaled File System handles the on-disk layout", May 2000, downloaded from http://jfs.sourceforge.net/project/pub/jfslayout.pdf (Nov. 4, 2014), pp. 1-30, United States.

Sweeney, A., et al., "Scalability in the XFS File System", Jan. 1996, USENIX Annual Technical Conference, p. 1-21, San Diego, United States.

List of IBM Patents or Patent Applications Treated as Related Form; Sarkar, P., U.S. Appl. No. 16/228,413, filed Dec. 20, 2018.

\* cited by examiner

JOURNAL-LESS RECOVERY FOR NESTED CRASH-CONSISTENT STORAGE SYSTEMS

BACKGROUND

Embodiments of the invention relate to file system writing and recovery, in particular, for storing and recovering data which provides fast durability and quick journal-less recovery in a file system.

For many entities today, including social media platforms, etc., high-performance analytics is required over user-facing large datasets completely resident in main memory. For such "big memory" workloads, there are challenges, such as low-overhead durability or persistence to enable fast runtime performance, and quick recovery to enable lower downtime.

BRIEF SUMMARY

Embodiments of the invention relate to file system storing and recovering data which provides fast durability and quick journal-less recovery. One embodiment includes a method that includes a write process that performs a write instruction for data that includes atomically updating corresponding data blocks and metadata-links on a storage medium. The metadata-links contain links from data blocks to parent metadata blocks and links from metadata blocks to the parent metadata blocks. A journal-less recovery process that detects one or more inconsistencies for file system blocks comprising data blocks or metadata blocks upon a system failure based on one or more comparisons of information for the file system blocks.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
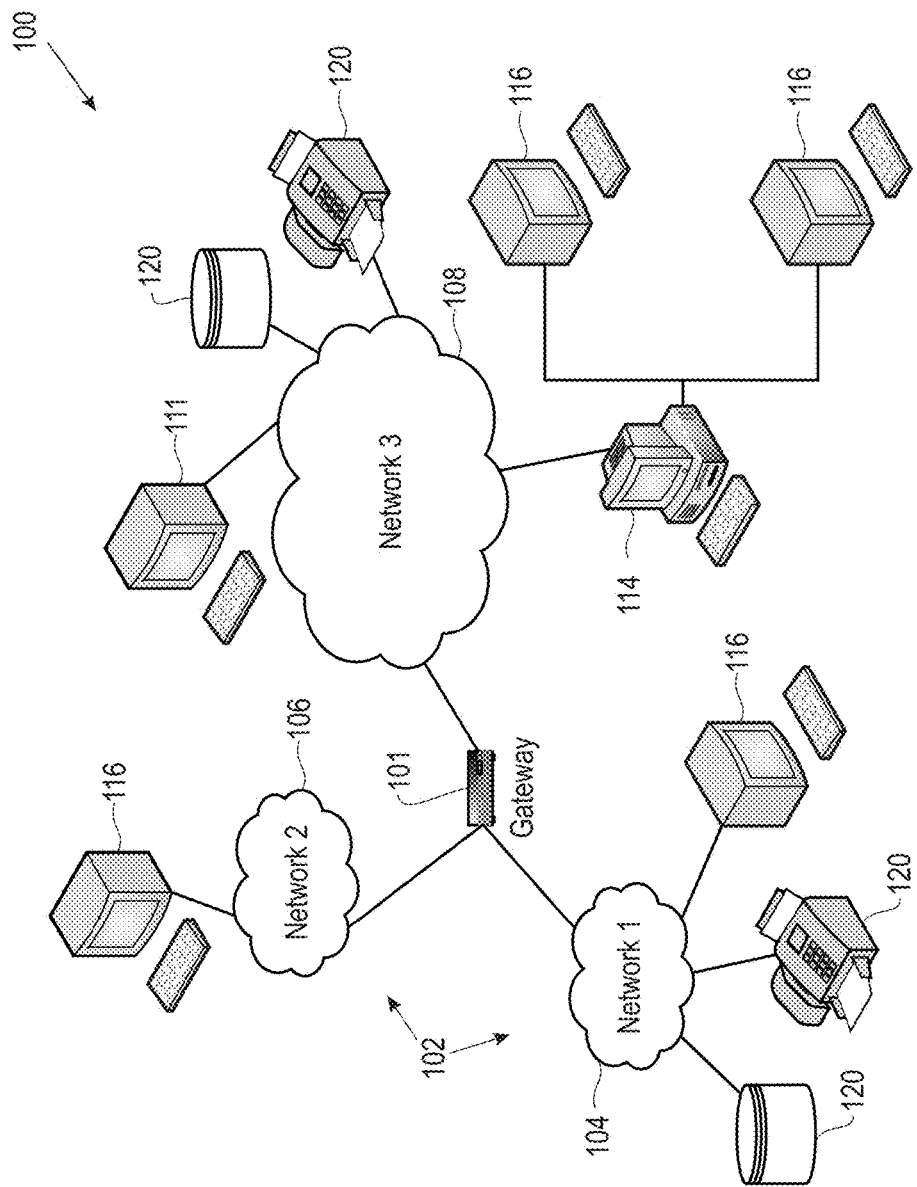
FIG. 1 is a network architecture for storing and recovering data for fast durability and quick journal-less recovery, according to an embodiment of the present invention.

FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

The traditional approach to providing durability "big memory" is through the use of journaling in file systems, logs in database management and storage systems. A journaling file system is a file system that keeps track of the changes that will be made in a journal (e.g., a circular log in a dedicated area of the file system) before committing the changes to the main file system.

Duplicated journaling at different layers in the storage stack results in poor performance and slower recovery. This is primarily because each layer introduces a set of additional writes and cache flushes for ordering and persisting updates to storage. Without journaling, recovery of file system and database structures requires a complete scan of the address space of the storage system. This increases the downtime because a file system cannot be mounted until a successful reconstruction of file system metadata during a file system check (fsck) scan. In addition to the performance loss and slow recovery, the additional writes reduce the lifetime for wearable storage technologies such as flash solid-state drives (SSDs) and non-volatile memory (NVM) technologies (e.g., non-volatile read and write memory (NVRAM)), which provide faster alternatives to disk storage for data durability.

In one or more embodiments, the system 100 utilizes a process for storing and recovering data for fast durability, quick journal-less recovery and crash-consistent storage. One or more embodiments provide fast durability and recovery applications after system crashes and power failures. In one embodiment, a write process provides atomic update of data without journaling, and a recovery process detects inconsistencies on first access to a file system block. In one embodiment, the write process inserts a metadata-link in the data or metadata block, and the recovery process detects inconsistencies by comparing the metadata-link and block addresses.

One or more embodiments provide a new disk-like block interface, reduces the performance costs of journaling at multiple levels and minimize recovery time after crash or power failure. In one embodiment, log management is not used for providing crash-consistency. Atomic-writes for disk and NVM/Flash SSDs are generalized and an atomic-write process embeds metadata links in atomic-write to data, which allows on-demand and faster recovery. An atomic-write operation may include an operation during which a processor can simultaneously read a location and write it in the same bus operation, which prevents any other processor or input/output (I/O) device from writing or reading memory until the operation is complete. Atomic implies indivisibility and irreducibility, such that an atomic operation is performed entirely or not performed at all. One or more embodiments do not incur additional flushes or writes for extra journal records, and application and file system crash-consistency is provided without incurring additional timing or bandwidth penalties for nested journal levels.

Figure 2:
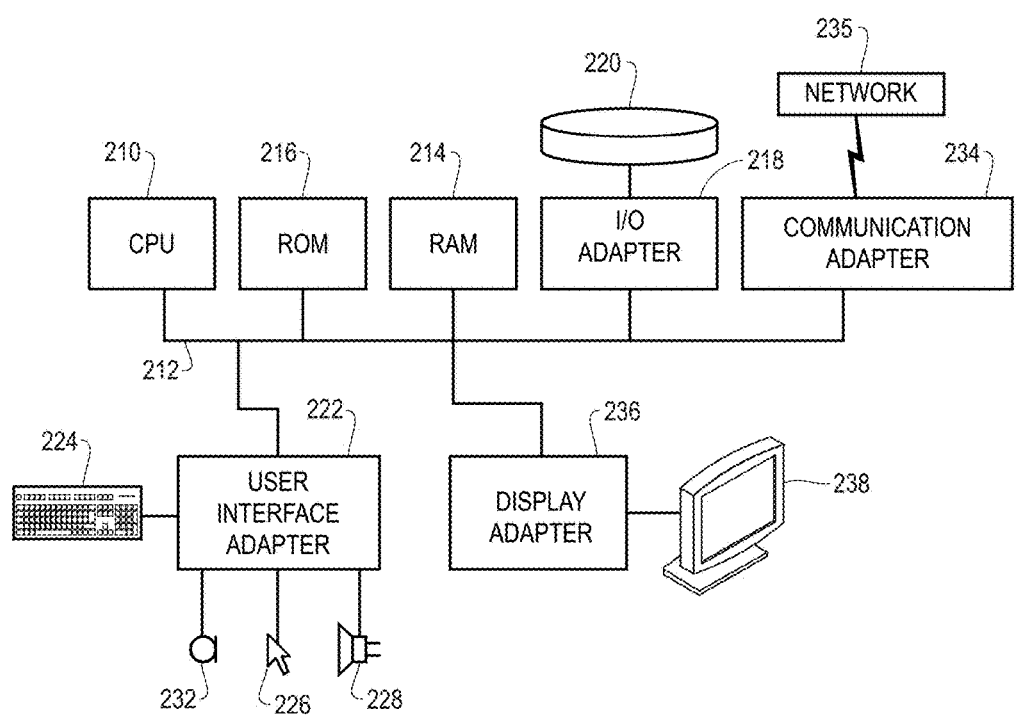
FIG. 2 shows a representative hardware environment that may be associated with the servers and/or clients of FIG. 1.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212.

The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
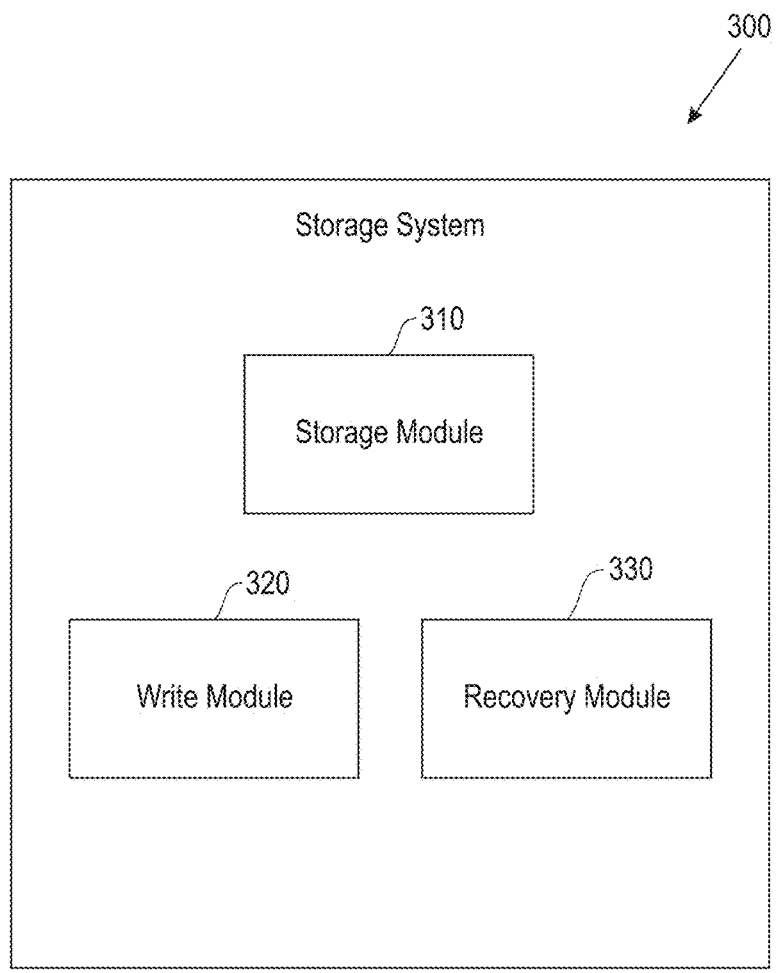
FIG. 3 illustrates a block diagram of an example storage system for storing and recovering data for fast durability and quick journal-less recovery, in accordance with an embodiment of the invention.

FIG. 3 shows an implementation of system 100 as a storage or file system 300. In one embodiment, the storage system 300 may be used for storing and recovering data for fast durability, quick journal-less recovery and crash-consistent storage. In one embodiment, the storage system 300 comprises a storage module 310, a write module 320, and a recovery module 330. In one embodiment, the storage module and the write module 320 combine to store data with a write process, which atomically updates data and metadata-links on a storage medium of the file system 300 together. In one embodiment, metadata-links include links from the file system data blocks to parent metadata blocks and from child metadata blocks to parent metadata blocks.

In one embodiment, the recovery module 330 provides a recovery process to detect inconsistencies on first read access to a block after a crash or power failure. In one embodiment, for data blocks, the data block address in the linked parent inode (index node) is compared against the logical block address of the child data block by the recovery module 330. In one embodiment, for metadata blocks, the inode number in the linked parent directory or inode is compared against the inode number of the child inode by the recovery module 330. If both match in a top-down access to data block, the branch is determined to be consistent by the recovery module 330. Otherwise, the branch can be pruned from the point of inconsistency and error returned for corresponding reads.

In one embodiment, the write module 320 and the recovery module 330 provide a nested write and recovery process for applications and the file system 300 is provided by reading the application metadata block, file system metadata block and the file system data block, and verifying metadata-links at each step.

Figure 4:
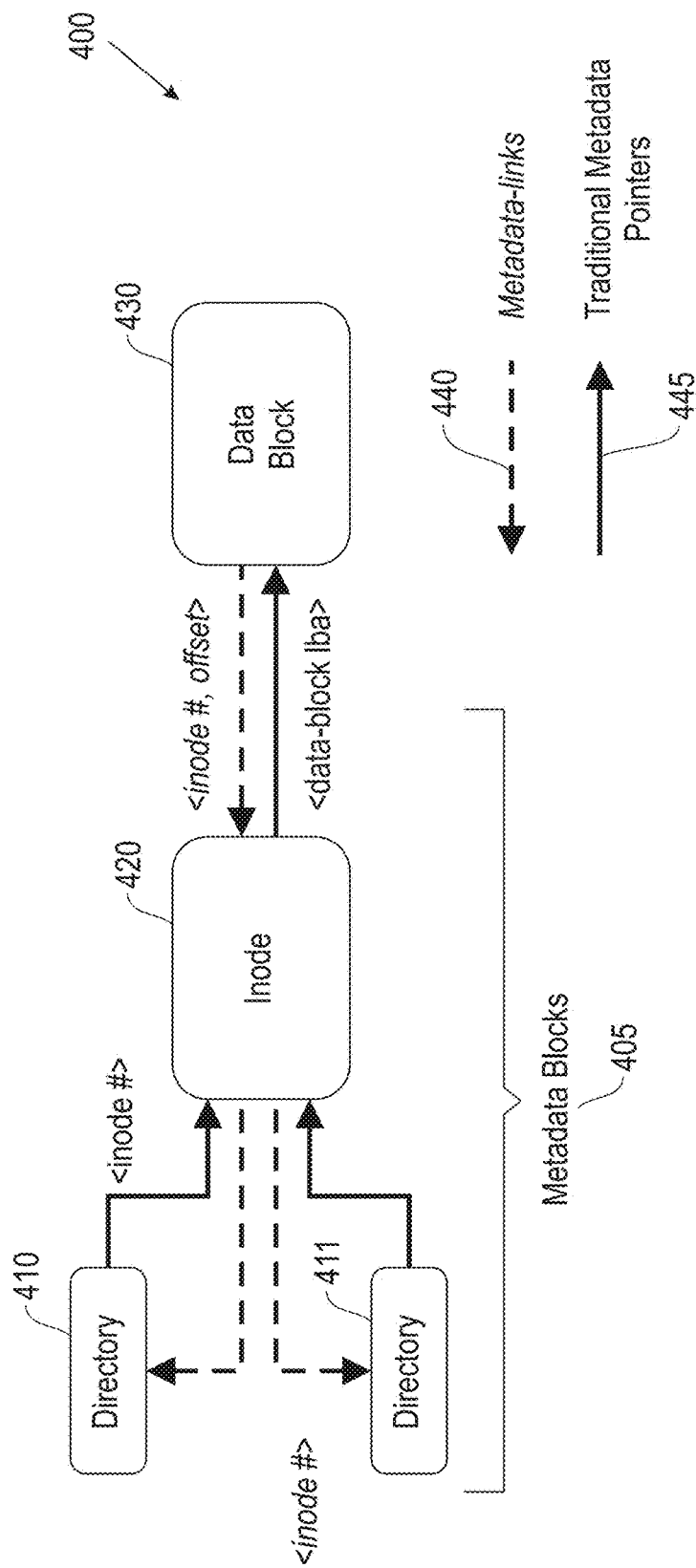
FIG. 4 illustrates an example high-level view of a metadata-links, in accordance with an embodiment of the invention, and also showing traditional metadata pointers for file system blocks.

FIG. 4 illustrates an example high-level view 400 of metadata-links 440, in accordance with an embodiment of the invention, and also showing traditional metadata pointers 445 for file system blocks. In one embodiment, a metadata-link 440 is stored in the out-of-band area of a file system block. In one embodiment, the meta-data link 440 provides the identity of the metadata block pointing to a data block 430, or the identity of a parent metadata block pointing to a child metadata block. In one embodiment, for one or more data blocks 430, the metadata-link 440 is stored within a data block and comprises the inode number (e.g., of an inode 420) and the file offset. The inode number points to the location of the inode 420 of the file containing this data block 430 within the metadata block segment on the storage medium (e.g., a storage disk). The file offset is the block offset within the file corresponding to this data block (e.g., data block 430). In one embodiment, metadata blocks 405 include inode blocks. In one embodiment, each inode block has a corresponding file in the file system. The metadata-link 440 stored within an inode block points to the inode 420 corresponding to the parent directory file (e.g., directory 410 or 411). In one embodiment, the metadata-link 440 does not need the block offset as in the case of a data block metadata-link 440 because the directory file (e.g., directory 410 or 411) contains the name of each child file.

In one embodiment, directory blocks are similar to inode blocks in that each directory block contains a metadata-link 440 pointing to the inode 420 of the parent directory file (e.g., directory 401 or 411). In one embodiment, a root directory is located at a fixed location on the storage medium (e.g., a storage disk) and does not require a metadata-link 440. In one embodiment, the root directory location provides for data access during recovery by reading the root directory file from the fixed location.

Figure 5:
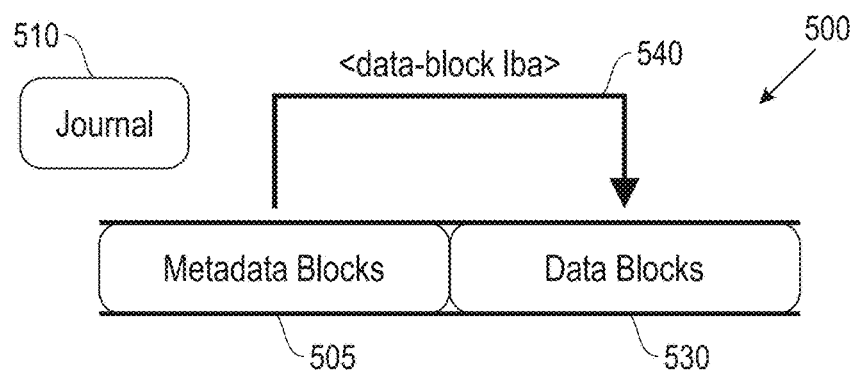
FIG. 5 illustrates an example showing writes in a journaled file system.

FIG. 5 illustrates an example showing writes in a journaled file system 500. Write atomicity can be conventionally provided in a file system through journaling using a traditionally metadata pointer 540 (<data-block lba>) (lba: logical block address). Each application write to a data block 530 gets converted into a sequence of writes and cache-flush requests sent to the storage system. This may be accomplished by the following steps: (1) write to a metadata block 505 in the journal 510, (2) initiate a cache-flush request, (3) write to a commit record within the journal 510, (4) provide a cache-flush request, and (5) provide an in-place update of the data block 530 and the metadata block 505.

Figure 6:
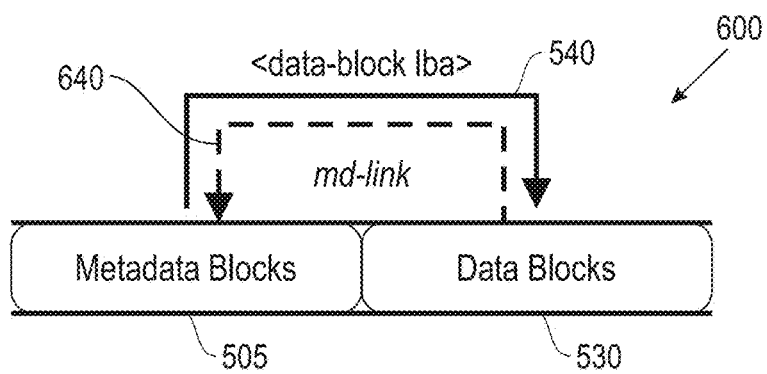
FIG. 6 illustrates atomic-write for data and metadata-link, in accordance with an embodiment of the invention.

FIG. 6 illustrates an atomic-write interface 600 for data blocks 530 and a metadata-link 640, in accordance with an embodiment of the invention. In one embodiment, instead of journaling, an atomic-write (Data block, metadata-link) interface is provided by the storage system to the host software. The atomic-write interface 600 eliminates the need for journal entries: steps 1-4 in the traditional process described above for the journaled file system 500 (FIG. 5). Instead, in one embodiment, the write only embeds the metadata-link 640 (as described above) and atomically updates the metadata-link 640 along with the write to a data block 530 and metadata block 505. In one embodiment, use of a metadata-link 640 saves four writes and two cache-flushes sent for each write to an application data block 530 corresponding to writing the journal entries in a traditional write process.

In one embodiment, the recovery process is performed on first access to a data or metadata block. Alternatively, the recovery process can also be performed in the background when there are no application reads or writes to be serviced. In one embodiment, in both cases, the recovery is performed without any downtime for which the file system could be unavailable as described below. In one embodiment, for recovering data blocks: each data block contains a metadata-link 640 (md-link) corresponding to the inode number and offset within the file. The recovery process detects an inconsistent data block 530 using the following: (1) read the metadata-link 640 from the data block 530, (2) read the inode corresponding to the inode number in the metadata-link 640 from the metadata block 505 segment on the storage medium 9 (e.g., a storage disk), (3) find the logical block address (LBA) of the data block 530 pointed by this inode at the offset in the metadata-link 640, (4) compare this LBA with the address of the data block 530. In one embodiment, if the two addresses match, the data block 530 is consistent and returned to the application as part of the read process. Otherwise, the data block 530 is inconsistent and an error is returned. In one embodiment, the invariant that the metadata-link 640 and data block 530 are updated atomically makes sure that a data block 530 always has the correct owner (file inode) as before the crash. Any inconsistency such as double allocation of a data block to two files resulting from a crash is identified using an atomic-write of the metadata-link 640 in the data block 530.

Figure 7:
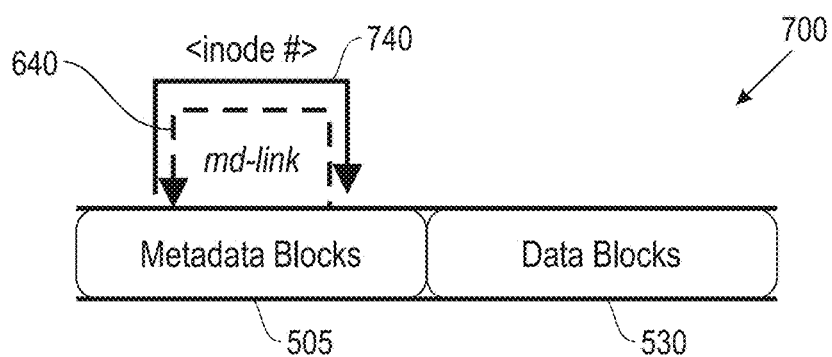
FIG. 7 illustrates recovering metadata blocks by traversing the metadata links, in accordance with an embodiment of the invention.

FIG. 7 illustrates a structure 700 for recovering metadata blocks 505 by traversing the metadata links 640, in accordance with an embodiment of the invention. In one embodiment, each metadata block 505 (directory or file inode) contains a metadata-link 640 pointing to the inode of the parent directory file. The recovery of the metadata block 505 follows a process similar to that for data blocks 530. In one embodiment, on reading a directory C, the inode number (<inode #> 740) corresponding to the child C in parent directory file P is compared against the actual address of the linked directory file inode. If the two match, there is no inconsistency and the child directory C is traversed further on the path resolution. Similarly, on reading a file inode C, the inode number corresponding to the child C in parent directory file P is compared against the linked file inode. If the two match, the file inode is consistent and used for further reading data blocks. In one embodiment, if there is any inconsistency found along a branch due to a mismatch, it refers to scenarios where the child block was deallocated before a system crash, but the parent metadata block still refers to the child block. In those scenarios, the atomic-write of the data block 530 has removed the metadata-link 640 from the child to old parent before system crash, and therefore the inconsistency arising because of the invalid parent to child link would be resolved during first read to the child metadata block.

Figure 8:
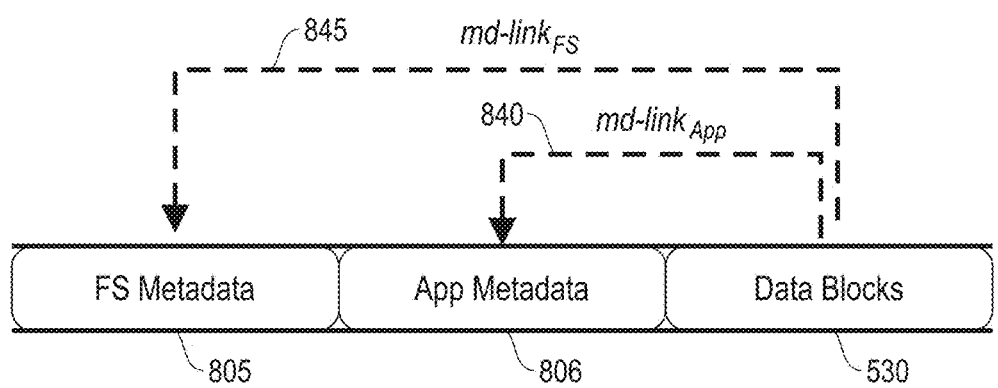
FIG. 8 illustrates metadata links for nested application and file system crash consistency, in accordance with an embodiment of the invention.

FIG. 8 illustrates a structure for metadata links 840 and 845 for nested application and file system crash consistency, in accordance with an embodiment of the invention. In one embodiment, the structure includes file system (FS) metadata 805, application (App) metadata 806, data blocks 530, an App metadata link (md-link$_{App}$) 840 and a FS md-link 845. In one embodiment, an application running atop the file system may have its metadata within the same segment as for file system data blocks 530. In one embodiment, the write process described above can be extended to embed the metadata-links from the data blocks 530 to application metadata blocks 806 along with metadata-links 805 for the file system. In one embodiment, the metadata-links are stacked in the out-of-band area of the atomic-write interface: atomic-write (D, <md-linkApp, md-linkFS>), where D is a data block. In one embodiment, the recovery process for nested application and file systems may be ordered top-down as the path to a data block is resolved: (1) the application metadata-link 840 is read from the data block 530 and compared against the application metadata block 806 within its segment, (2) the file system metadata-link 845 is read from the data block 530 and compared against the file system metadata block 805 within its segment, and (3) the data block 530 is verified by comparing the inode number and offset in the file system metadata-link 845. In one embodiment, if all of the comparisons are verified, the data is recovered and returned to the application. Otherwise, an error is returned to the application.

Figure 9:
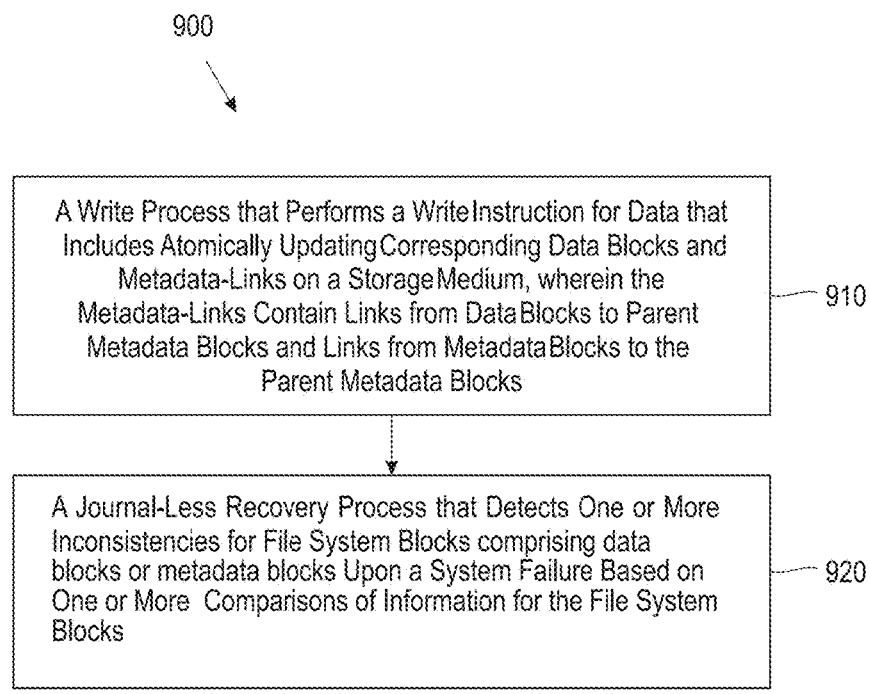
FIG. 9 is a block diagram showing a process for storing and recovering data for fast durability and quick journal-less recovery, in accordance with an embodiment of the invention.

FIG. 9 is a block diagram showing a process 900 for storing and recovering data for fast durability and quick journal-less recovery, according to one embodiment. In one embodiment, in block 910 process 900 includes a write process that performs a write instruction for data that includes atomically updating corresponding data blocks and metadata-links on a storage medium, wherein the metadata-links contain links from data blocks to parent metadata blocks and links from metadata blocks to the parent metadata blocks. In one embodiment, in block 920, process 900 includes a journal-less recovery process that detects one or more inconsistencies for file system blocks comprising data blocks or metadata blocks upon a system failure based on one or more comparisons of information for the file system blocks. In one embodiment, the system failure may include a system crash or power failure.

In one embodiment, the detecting in block 920 may include reading a file system block. If the file system block comprises a data block, block 920 may include comparing the data block with data in a metadata block linked from the data block via a metadata link. If the block comprises a metadata block, block 920 may include comparing the metadata block with data in the parent metadata block linked from the metadata block via a metadata-link.

In one embodiment, the metadata blocks contains inode blocks each of which corresponds to each file in the file system, and directory blocks each of which corresponds to each directory in the file system, and each metadata block contains a metadata link pointing to an inode of a parent directory file. In one embodiment, comparing the data block with data in a metadata block may include comparing a logical data address of the data block with a data block address in an inode. In one embodiment, process 900 may further include comparing the metadata block with data in the parent metadata block by comparing an inode number of the inode of the inode or directory blocks with an inode number in the parent directory or inode.

In one embodiment, block 910 may include atomically updating based on embedding the metadata-links from the data blocks to application metadata blocks of an application along with links from the data blocks to the file system metadata blocks. In one embodiment, block 920 may further include detecting one or more inconsistencies based on: a first comparison that includes comparing a data block with an application metadata block within a block segment, using application metadata-links for the application; a second comparison that includes comparing the data block with the file system metadata blocks within the block segment; verifying the data block by a third comparison that includes comparing an inode number and offset in a file system metadata-link; and if the first comparison, the second comparison and the third comparison do not return a matched result, returning an error to the application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for storing and recovering data for a file system comprising:
   a write process that performs a write instruction for data that includes atomically updating corresponding data blocks and metadata-links on a storage medium, wherein the metadata-links contain links from data blocks to parent metadata blocks, links from child metadata blocks to the parent metadata blocks, and a link comprises a pointer to a memory address, an inode number and an offset; and
   a journal-less recovery process for detecting one or more inconsistencies for file system blocks comprising file system data blocks or file system metadata blocks upon a system failure based on multiple different types of comparisons of information for the file system blocks.

2. The method of claim 1, wherein detecting comprises:
   reading a particular file system block;
   if the particular file system block comprises a particular data block, comparing information in the particular data block with information in a parent metadata block that is linked from the particular data block via a metadata-link, and
   if the particular file system block comprises a child metadata block, comparing information in the child metadata block with information in the parent metadata block that is linked from the child metadata block via a metadata-link.

3. The method of claim 2, wherein metadata blocks contain inode blocks each of which corresponds to a respective file in the file system, directory blocks each of which corresponds to each directory in the file system, and each metadata block contains a metadata-link pointing to an inode of a parent directory file.

4. The method of claim 3, wherein:
   comparing the information in the particular data block with information in a parent metadata block includes comparing a logical data address of the particular data block with a data block address in an inode.

5. The method of claim 1, wherein atomically updating includes embedding application metadata-links from data blocks to application metadata blocks of an application along with file system metadata links from the data blocks to file system metadata blocks.

6. The method of claim 1, wherein:
   the multiple different types of comparisons comprise:
      a first comparison that includes comparing information from an application metadata-link read from a particular data block within a block segment that comprises a particular file system metadata block, a particular application metadata block and the particular data block, with information from the particular application metadata block within the block segment, wherein a first result from the first comparison comprises a positive match or a negative match;
      a second comparison that includes comparing information from a file system metadata-link read from the particular data block within the block segment, with information from the particular file system metadata block within the block segment, wherein a second result from the second comparison comprises a positive match or a negative match; and
a third comparison that includes comparing a first inode number in the file system metadata-link, with a second inode number in the application metadata-link, and comparing a first offset in the file system metadata-link, with a second offset in the application metadata-link, wherein a third result from the third comparison comprises a positive match or a negative match, and the third comparison is used for verifying the particular data block; and
if the first result, the second result and the third result do not each return positive match results, an error is returned to the application.

7. The method of claim 1, wherein the system failure comprises one of a system crash or power failure.

8. A computer program product for storing and recovering data for a file system, the computer program product comprising a non-transitory computer readable storage device having program code embodied therewith, the program code executable by a processor to:
perform a write instruction for data that includes atomically updating corresponding data blocks and metadata-links on a storage medium, wherein the metadata-links contain links from data blocks to parent metadata blocks, links from child metadata blocks to the parent metadata blocks, and a link comprises a pointer to a memory address, an inode number and offset; and
detect one or more inconsistencies for file system blocks comprising file system data blocks or file system metadata blocks upon a system failure based on multiple different types of comparisons of information for the file system blocks.

9. The computer program product of claim 8, wherein detecting comprises:
reading a particular file system block;
if the particular file system block comprises a particular data block, comparing information in the particular data block with information in a parent metadata block that is linked from the data block via a metadata-link, and
if the particular file system block comprises a child metadata block, comparing information in the child metadata block with information in the parent metadata block that is linked from the child metadata block via a metadata-link.

10. The computer program product of claim 9, wherein metadata blocks contain inode blocks each of which corresponds to a respective file in the file system, directory blocks each of which corresponds to each directory in the file system, and each metadata block contains a metadata-link pointing to an inode of a parent directory file.

11. The computer program product of claim 10, wherein:
comparing the information in the particular data block with information in a parent metadata block includes comparing a logical data address of the particular data block with a data block address in an inode.

12. The computer program product of claim 8, wherein atomically updating includes embedding application metadata-links from data blocks to application metadata blocks of an application along with file system metadata links from the data blocks to file system metadata blocks.

13. The computer program product of claim 8, wherein: the multiple different types of comparisons comprise:
a first comparison that includes comparing information from an application metadata-link read from a particular data block within a block segment that comprises a particular file system metadata block, a particular application metadata block and the particular data block, with information from the particular application metadata block within the block segment, wherein a first result from the first comparison comprises a positive match or a negative match;
a second comparison that includes comparing information from a file system metadata-link read from the particular data block within the block segment, with information from the particular file system metadata block within the block segment, wherein a second result from the second comparison comprises a positive match or a negative match; and
a third comparison that includes comparing a first inode number and a first offset in the file system metadata-link, with a second inode number and a second offset in the application metadata-link, wherein a third result from the third comparison comprises a positive match or a negative match, and the third comparison is used for verifying the particular data block; and
if the first result, the second result and the third result do not each return positive match results, an error is returned to the application.

14. The computer program product of claim 8, wherein the system failure comprises one of a system crash or power failure.

15. A system comprising:
a file system including a primary storage device; and
a write process that performs a write instruction for data that includes atomically updating corresponding data blocks and metadata-links on a storage medium, wherein the metadata-links contain links from data blocks to parent metadata blocks, links from child metadata blocks to the parent metadata blocks, and a link comprises a pointer to a memory address, an inode number and offset; and
a recovery process that provides journal-less recovery based on detecting one or more inconsistencies for file system blocks comprising file system data blocks or file system metadata blocks upon a system failure based on multiple different type of comparisons of information for the file system blocks.

16. The system of claim 15, wherein the recovery process provides detecting based on:
reading a particular file system block;
determining if the particular file system block comprises a particular data block;
comparing information in the particular data block with information in a parent metadata block that is linked from the particular data block via a metadata-link if the particular file system block comprises a data block, and
if the particular file system block comprises a child metadata block, comparing information in the child metadata block with information in the parent metadata block that is linked from the child metadata block via a metadata-link.

17. The system of claim 16, wherein metadata blocks contain inode blocks each of which corresponds to a respective file in the file system, directory blocks each of which corresponds to each directory in the file system, and each metadata block contains a metadata-link pointing to an inode of a parent directory file.

18. The system of claim 17, wherein:
comparing information in the particular data block with information in a parent metadata block includes the recovery process comparing a logical data address of the particular data block with a data block address in an inode; and atomically updating includes the write process embedding application metadata-links from the data blocks to application metadata blocks of an application along with file system metadata links from the data blocks to the file system metadata blocks.

19. The system of claim 15, wherein:

the multiple different types of comparisons comprise:

a first comparison that includes comparing information from an application metadata-link read from a particular data block within a block segment that comprises a particular file system metadata block, a particular application metadata block and the particular data block, with information from the particular application metadata block within the block segment, wherein a first result from the first comparison comprises a positive match or a negative match;

a second comparison that includes comparing information from a file system metadata-link read from the particular data block within the block segment, with information from the particular file system metadata block within the block segment, wherein a second result from the second comparison comprises a positive match or a negative match; and a third comparison that includes comparing a first inode number and a first offset in a file system metadata-link, with a second inode number and a second offset in the application metadata-link, wherein a third result from the third comparison comprises a positive match or a negative match, and the third comparison is used for verifying the particular data block; and if the first result, the second result and the third result do not each return positive match results, an error is returned to the application.

20. The system of claim 15, wherein the system failure comprises one of a system crash or power failure.

* * * * *